United States Patent
Sato et al.

[11] Patent Number: 5,850,316
[45] Date of Patent: Dec. 15, 1998

[54] TAPE CARTRIDGE AND DRIVING SYSTEM HAVING ROTATION DETECTION UNIT FOR DRIVE ROLL TO MAINTAIN CONSTANT CONTACT PRESSURE WITH THE CAPSTAN ROLL

[75] Inventors: Masanori Sato; Kengo Saito; Osamu Koizumi, all of Miyagi, Japan

[73] Assignee: Sony Corporation, Japan

[21] Appl. No.: 825,590

[22] Filed: Apr. 1, 1997

Related U.S. Application Data

[63] Continuation of Ser. No. 505,817, Jul. 21, 1995, abandoned.

[30] Foreign Application Priority Data

Jul. 29, 1994 [JP] Japan .................................... 6-179319

[51] Int. Cl.$^6$ ............................. G11B 15/28; G11B 23/30
[52] U.S. Cl. ........................ 360/93; 360/132; 360/73.04; 242/344
[58] Field of Search ................................. 360/72.2, 96.3, 360/74.2, 93, 73.01, 73.04, 73.09, 132, 96.5; 242/357, 352.4, 333.6, 344, 342

[56] References Cited

U.S. PATENT DOCUMENTS

| | | |
|---|---|---|
| 4,172,231 | 10/1979 | d'Alayer de Costemore d'Arc et al. .................................................................... 242/357 |
| 4,301,488 | 11/1981 | Ramisch ................................. 242/344 |
| 4,445,651 | 5/1984 | Kimizuka et al. ................... 242/334.4 |
| 4,488,690 | 12/1984 | Merle ................................. 242/352.4 |
| 4,575,022 | 3/1986 | Allwine, Jr. et al. ................. 242/192 |
| 4,688,742 | 8/1987 | Hettich ................................. 242/352.4 |
| 4,996,611 | 2/1991 | Ito ........................................ 360/72.3 |
| 5,025,334 | 6/1991 | Perona et al. ......................... 360/96.5 |
| 5,087,993 | 2/1992 | Kobayashi ............................ 360/73.01 |
| 5,236,146 | 8/1993 | Rudi et al. .............................. 242/340 |
| 5,264,972 | 11/1993 | Solhjell ................................ 360/73.04 |
| 5,282,098 | 1/1994 | Ohta et al. ............................ 360/73.04 |
| 5,323,279 | 6/1994 | Yokomachi et al. ................... 360/26.2 |

FOREIGN PATENT DOCUMENTS

| | | |
|---|---|---|
| 0537410 | 4/1993 | European Pat. Off. . |
| 0 565 770 | 10/1993 | European Pat. Off. . |
| 2655180 | 6/1978 | Germany . |
| 62-134841 | 6/1987 | Japan .................................... 360/96.1 |
| 2103179 | 2/1983 | United Kingdom . |

OTHER PUBLICATIONS

Dollwetzel, R. H., "Eigenschaften und Anwendungen von Reflexlichtschranken", Feinwerktechnik & Messtechnik, Vo. 93, No. 7, Oct. 1985.

*Primary Examiner*—Brian E. Miller
*Attorney, Agent, or Firm*—Ronald P. Kananen

[57] ABSTRACT

The rotation of a drive roll is detected using an rpm detection enabling element provided on the drive roll in order to control the driving device and reduce data error and loss of storage capacity. A cover member 3 and a base plate 4 make up a main cartridge member 2 within which a pair of tape reels 8, 9 are accommodated. A magnetic tape 7, placed around the tape reels 8 and 9, is driven by a drive roll 13 the outer periphery of which is partially exposed via an opening 21 formed in the front surface of the cover member 3. A capstan roll 46 of a driving device 40 is in surface contact with the driving roll 13 for transmitting its rotation to the drive roll. A rpm detection enabling element 34 is provided on the drive roll 13 and is detected through a detection window 35 provided in the cover member 3. The rotational speed difference between the drive roll and the capstan roll is used to detect slip therebetween.

13 Claims, 8 Drawing Sheets

TAPE CARTRIDGE AND DRIVING SYSTEM HAVING ROTATION DETECTION UNIT FOR DRIVE ROLL TO MAINTAIN CONSTANT CONTACT PRESSURE WITH THE CAPSTAN ROLL

This application is a continuation of application Ser. No. 08/505,817 filed Jul. 21, 1995 now abandoned.

BACKGROUND OF THE INVENTION

This invention relates to a tape cartridge employed for data backup for personal or office computers, known as a data cartridge. More particularly, it relates to a tape cartridge in which a magnetic tape for recording data signals is adapted to be driven via an endless driving belt.

The tape cartridge, known as a data cartridge, is loaded into a data backup device connected to a main apparatus, such as a recording/reproducing apparatus or an office computer, for backing up data stored in e.g., a memory of the main apparatus a magnetic tape or, alternatively, furnishing data recorded on the magnetic tape to e.g., a memory of the main apparatus.

The tape cartridge has a main cartridge member comprised of a shallow cup-shaped cover member and a base plate. Within the main cartridge member is a magnetic tape which is reeled out from a tape supply reel so as to run along the inner surface of the cover member before being taken up by a tape take-up reel by the operation of a magnetic tape driving system. The magnetic tape driving system is made up of an endless driving belt, a drive roll and a pair of belt guide rolls. The endless driving belt is placed around the drive roll and the belt guide rolls.

The drive roll is formed of an elastic material exhibiting good resistance to abrasion and is rotatably accommodated in the main cartridge member so that a portion of the outer periphery thereof is exposed to outside of the main cartridge member. That is, the driving roll has a driving flange portion on its upper portion which is circumferentially protruded so that its peripheral surface is exposed via an opening formed in the cover member into rolling contact with a capstan roll of a driving device in order to have rotation transmitted thereto from the capstan roll. The drive roll is rotatably mounted on a supporting shaft mounted upright at a mid-portion of the forward side of a base plate constituting the main cartridge member.

The belt guide rolls are also formed of an elastic material exhibiting resistance to abrasion and are rotatably supported by a pair of supporting shafts mounted upright at rear side corners of the base plate. The endless driving belt is formed by stretch molding a polyurethane resin material admixed with carbon and is placed around the belt guide rolls and the tape supply and tape take-up reels. The driving belt is routed via a mid-region between the reels so as to be placed around the drive roll so as to run along a substantially convexed travel path within the main cartridge member. Thus, the change in belt direction about the outer peripheral surface of the tape supply and tape take-up reels, is such as to establish a pre-set tension against the portion of the magnetic tape wound on the two reels.

The tape cartridge also has a recording/reproducing aperture usually closed by a lid member. When the tape cartridge is loaded into the device, the lid member is rotated to open the recording/reproducing aperture and to permit the recording/reproducing head of the driving device to be introduced via the opened recording/reproducing aperture into sliding contact with the magnetic tape travelling along the inner surface of the cover member. The magnetic tape is driven by the endless driving belt which constitutes a part of the magnetic tape driving system along with the drive roll rotated by the capstan roll of the driving device.

The drive roll is configured to have a surface contact with the capstan roll of the driving device at a contact load of 500 g so as to have rotation transmitted thereto from the capstan roll. However, it frequently occurs that rotation cannot be efficiently transmitted between the drive roll and the capstan roll due to slip between the drive roll and the capstan roll, with the result that the magnetic tape does not run with an accurate and stable velocity. Such troubles lead to temporal deviation in the recording and reproduction of data signals by the magnetic head and to difficulties in recording/reproduction of data signals, while producing data errors thereby significantly lowering the recordable capacity of the tape cartridge.

The data signal recording capacity of the tape cartridge is lowered by 20% on an average due to the above-described loss in rotation transmission between the drive roll and the capstan roll. The conventional practice for overcoming this inconvenience has been to provide a processing circuit for electrically processing recording and playback signals on e.g. the driving device for maintaining a pre-set recording capacity or processing data signals on the premises that rotation transmission loss between the drive roll and the capstan roll is inevitable.

To overcome this problem of rotation transmission loss between the drive roll and the capstan roll, it may also be contemplated to increase the contact pressure between the drive roll and the capstan roll. However, in this case, a high driving torque motor is required thus raising the cost of the driving device.

SUMMARY OF THE INVENTION

It is therefore a principal object of the present invention to provide a tape cartridge wherein the rotation of the drive roll can be detected using an rpm detection enabling element which is provided on the drive roll and a control system provided on the driving device to reduce data errors and/or prevent loss in recording capacity.

The tape cartridge according to the present invention has a main cartridge member having a cover member, a base plate, and a pair of tape reels rotatably housed therein. The tape cartridge also has a magnetic tape which is engaged with the tape reels and adapted to travel along the front surface of the cover member. A drive roll which is rotatably housed within the main cartridge member is partially exposed via an opening formed in a front surface of the cover member. The drive roll is pressed against a capstan roll of a driving device to permit rotation to be transmitted thereto from said capstan roll. The tape cartridge also has an endless driving belt engaged with the outermost periphery of the magnetic tape placed around the tape reels and the drive roll, for transmitting the rotation of the driving roll to the magnetic tape. The drive roll has an rpm detection enabling element provided thereon for enabling detection of the rotational speed of the driving member. The cover member has a window in a position facing the drive roll and the rpm detection enabling element for enabling the detection of the revolution speed of the drive roll.

With the tape cartridge according to one aspect of the present invention, the rpm detection enabling element comprises a groove formed in a part of an outer rim formed on the upper surface of the drive roll facing the cover member, a rib-like protrusion extending towards the axis from the outer rim of the upper surface of the drive roll faces the cover member. Alternatively, a marker is formed on a peripheral surface or an upper surface of the drive roll facing the lateral surface or the top surface of the cover member.

With the tape cartridge according to the present invention, the cover member is formed of a transparent or semi-transparent synthetic resin material exhibiting high light transmittance. The rpm detection enabling element of the drive roll is detected via a detection window provided in the cover member by optical detection means provided on the driving device. The detection window is formed by reducing the thickness of a portion of the cover member which is opposite the rpm detection enabling element provided on the drive roll. Alternatively, the detection window comprises an opening which is formed in a portion of the cover member opposite the drive roll.

When the tape cartridge according to the present invention is loaded on the driving device, the driving roll is pressed against the capstan roll so that rotation is transmitted from the capstan roll to the drive roll. The drive roll has its rpm detection enabling element detected by photodetector means arranged on the driving device via the detection window provided in the cover member. The information detected by the photodetector means is compared with information of the indicating the rotational speed of the capstan roll for performing a pre-set control operation. The control operation is carried out by adjusting the rotational velocity of the capstan roll, contact pressure between the capstan roll and the drive roll or the recording frequency of the recording head. Thus, the tape cartridge may be adjusted for rotation transmission loss between the drive roll and the capstan roll for decreasing the occurrence of data errors or preventing loss of recording capacity.

With the tape cartridge according to the present invention, the state of rotation of the drive roll can be detected by the photodetector means so that the rotation transmission loss between the drive roll and the capstan roll due to slip, may be coped with by the control of the driving device. Consequently, errors during recording/reproducing operation may be prevented and loss in storage capacity may be reduced, while the tape cartridge may be improved in operational reliability.

DETAILED DESCRIPTION OF THE PREFERRED EMBODIMENTS

Referring to the drawings, preferred embodiments of the present invention will be explained in detail.

Figure 1:
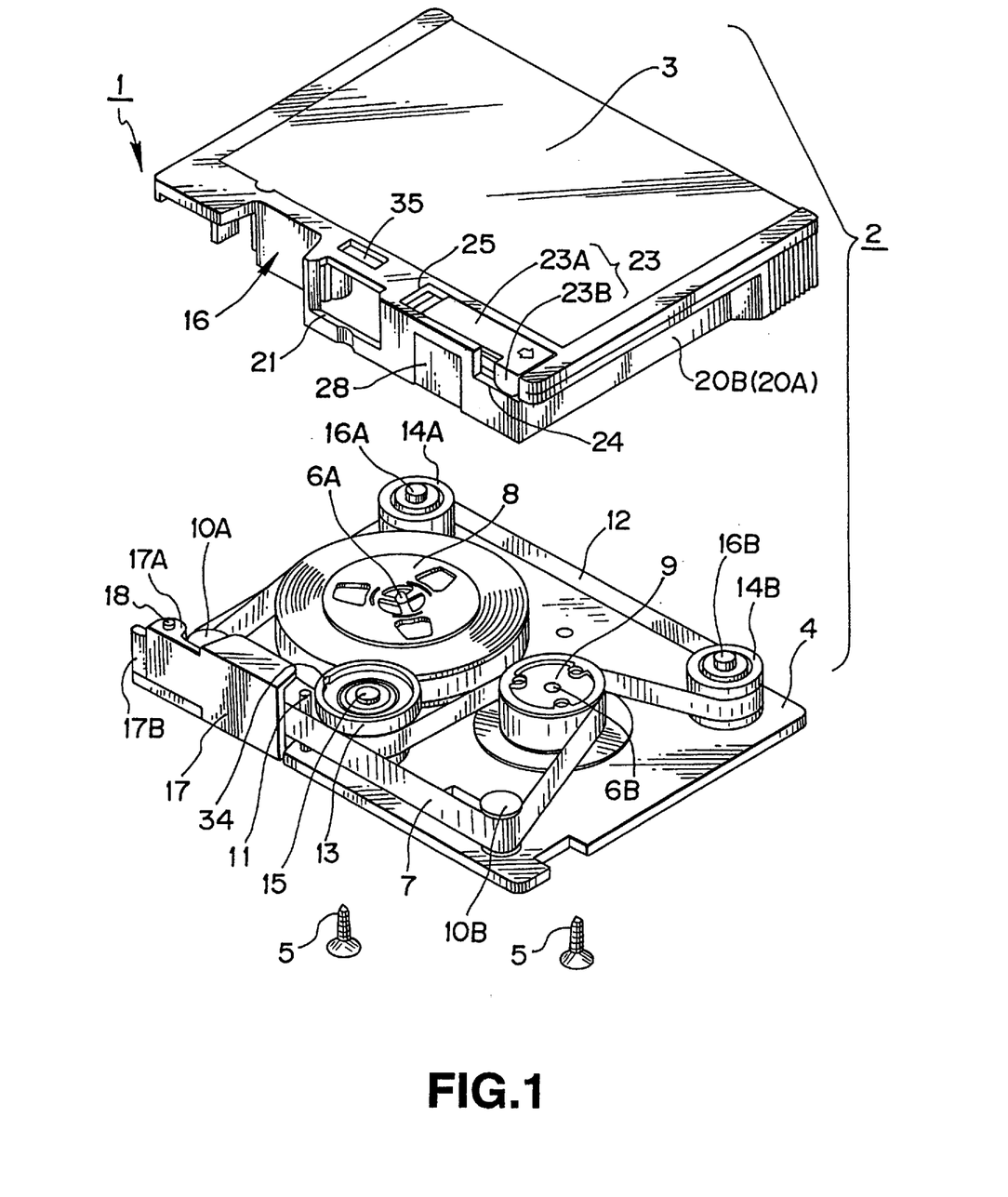
FIG. 1 is an exploded perspective view showing a tape cartridge according to the present invention, with a cover member removed.
Figure 2:
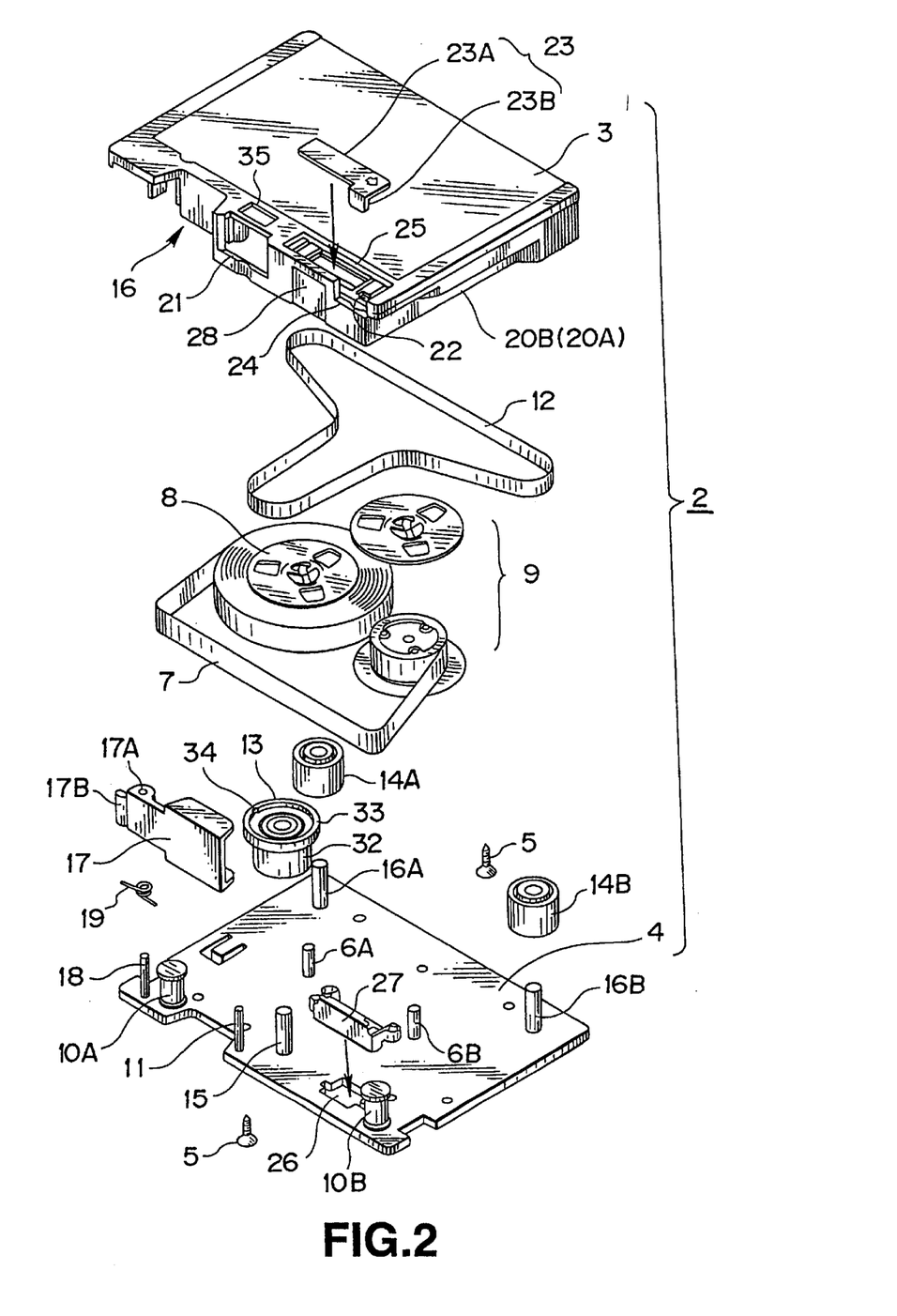
FIG. 2 is an exploded perspective view of the tape cartridge illustrating an internal mechanism thereof.
Figure 3:
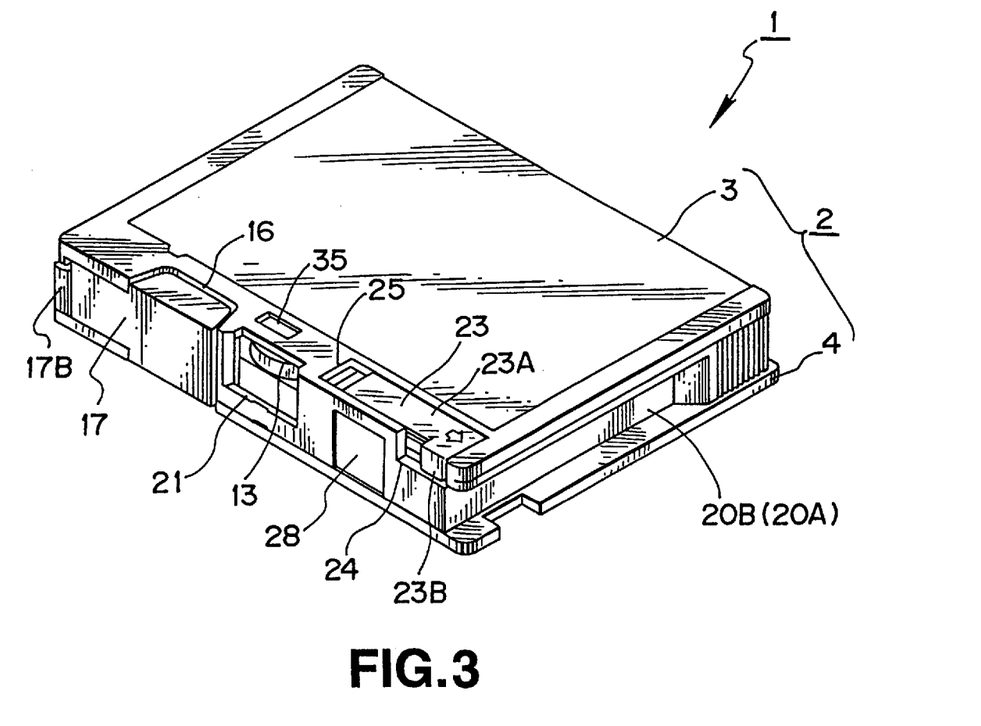
FIG. 3 is a perspective view of the tape cartridge.

A data cartridge 1 as shown in FIGS. 1 to 3 is basically configured similarly to the conventional tape cartridge and includes a cover member 3 formed of a transparent synthetic resin having excellent light transmittance, such as polycarbonate resin, in the shape of a shallow cup or lid, and a metal base plate 4, such as aluminum or aluminum alloy, arranged on the lower side of the cover member 3. The cover member 3 and the base plate 4 are connected together by set screws and integral mounting studs, not shown, to form a main cartridge member 2.

At a mid-portion of the base plate 4 is mounted a pair of supporting shafts 6A, 6B at a longitudinal spacing from each other. A tape supply reel 8 and a tape take-up reel 9, on which is placed a magnetic tape 7, are rotatably carried by these supporting shafts 6A, 6B. The tape supply reel member 8 and the tape take-up reel member 9 are each constituted by a lower reel member formed with a reel hub and an upper flange member combined with the lower reel member. The leading and trailing ends of the magnetic tape 7 are secured to the reel hubs by clampers, not shown.

The magnetic tape 7, reeled out from the tape supply reel 8, is engaged with tape guide rolls 10A, 10B and a guide pin 11 mounted on the forward side of the base plate 4, so that the tape 7 travels along the front surface of the cover member 3 in the inside of the main cartridge member 2 so as to be taken up by the tape take-up reel 9. The tape guide rolls 10A, 10B are rotatably mounted on supporting shafts mounted upright on both corners on the front side of the base plate 4 and are provided with circumferential flanges for preventing disengagement of the magnetic tape 7.

The tape cartridge 1 is provided with a magnetic tape driving mechanism for running the magnetic tape 7 reeled out from the tape supply reel 8 towards the tape take-up reel 9. The magnetic tape driving mechanism is made up of an endless driving belt 12, a drive roll 13 and a pair of belt guide rolls 14A, 14B around which the endless driving belt 12 is wrapped. The drive roll 13, details of which are explained later, has a cylindrical shape and is made from an elastic material exhibiting good abrasion resistance, and is rotatably mounted on a supporting shaft 15 set upright at a mid portion on the front side of the base plate 4.

The belt guide rolls 14A, 14B are also formed of an elastic material exhibiting good abrasion resistance, and are rotatably mounted on a pair of upright supporting shafts 16A, 16B at the rear side corners of the base plate 4. The endless driving belt 12, kept in pressure contact with the outer periphery of the magnetic tape 7, is placed around the tape supply reel 8 and the tape take-up reel 9 via the belt guide rolls 14A, 14B, and is caused to change direction and passes around the drive roll 13 through a vacant portion between the tape supply reel 8 and the tape take-up reel 9, as shown in FIG. 1. Thus, the endless driving belt 12 travels along a substantially convexed path within the main cartridge member 2.

Towards a corner on the front surface of the main cartridge member 2 is formed a recording/reproducing aperture 16 by cutouts formed in the front edges of the cover member 3 and the base plate 4. A recording/reproducing magnetic head, not shown, is inserted into this aperture 16 by a driving device 40 into which the tape cartridge 1 is loaded. The recording/reproducing aperture 16 is normally closed by a lid member 17 constituting a portion of the front surface section of the main cartridge member 2.

The lid member 17 is rotatably supported in a cantilever fashion by the main cartridge member 2 and has a supporting shaft 18, mounted upright on the forward corder of the base plate 4, fitted into a bearing member 17A formed on one side of the lid member 17. The lid member 17 is biased by a torsion spring 19, entwined on the supporting shaft 18, in a direction which closes the recording/reproducing aperture 16. On a lateral side of a supporting portion of the lid member 17 is an integral cam member 17B which protrudes towards an insertion guide recess 20A formed in a lateral surface of the main cartridge member 2.

The front side of the cover member 3, that is the front side of the main cartridge member 2, is formed with a rectangular driving opening 21 via which the peripheral surface of the drive roll 13 is partially exposed. Into this rectangular opening 21 is intruded a capstan roll 46 of the driving device 40 when the tape cartridge 1 is loaded on the driving device 40.

The tape cartridge 1 has an inadvertent recording prohibiting mechanism in order to prevent inadvertent erasure of valuable data recorded on the magnetic tape 7. The inadvertent recording prohibiting mechanism is made up of an inadvertent recording detection opening 22 and an inadvertent recording prohibiting member 23 provided on the main cartridge member 2 on the opposite side with respect to the lid member 17. That is, the front side of the cover member 3 is formed with a slide groove 24 along which slides an inadvertent recording inhibiting portion 23A of the inadvertent recording prohibiting member 23, while an inadvertent recording detecting opening 22 is formed in the slide groove 24.

The inadvertent recording detecting opening 22 is opened on the upper surface of the cover member 3 and an actuating guide opening 25, into which the inadvertent recording prohibiting member 23 is loaded, is bored in the upper surface of the cover member 3 in communication with the upper portion of the opened inadvertent recording prohibiting member 23. The actuating guide opening 25 is a rectangular opening in the upper surface of the main cartridge member 2 extending along the front surface of the main cartridge member 2. The actuating guide opening 25 is formed in the upper surface of the cover member 3 and is of a length sufficient to permit an inadvertent recording prohibiting portion 23B to be moved between a first position of opening the inadvertent recording detection opening 22 and a second position of closing the inadvertent recording detection opening 22. The slide groove 24 is also formed in the front side of the main cartridge member 2 as a rectangular groove having a length sufficient to permit the inadvertent recording prohibiting portion 23B to be moved between a first position of opening the inadvertent recording detection opening 22 and a second position of closing the inadvertent recording detection opening 22.

The inadvertent recording prohibiting member 23 is molded from a synthetic resin material and is made up of the plate-shaped actuating portion 23A and the inadvertent recording prohibiting portion 23B bent perpendicularly at an end of the plate-shaped actuating portion 23A. The actuating portion 23A of the inadvertent recording prohibiting member 23 is of a thickness such that, when the inadvertent recording prohibiting member 23 is loaded in the actuating guide opening 20, the actuating portion 23A is flush with the upper surface of the cover member 3. The inadvertent recording prohibiting portion 23B has a shape and size such that, when the inadvertent recording prohibiting member 23 is moved to the second position, the inadvertent recording prohibiting portion 23B is capable of closing the inadvertent recording detection opening 22.

The above-described inadvertent recording prohibiting mechanism enables data signals to be recorded on the magnetic tape 7 by the recording/reproducing head of the driving device 40 when the inadvertent recording prohibiting member 23 is actuated and set in the second position. When the inadvertent recording prohibiting member 23 is actuated and set in the first position on the left-hand side of the cover member 3 along the actuating guide opening 25, and the inadvertent recording prohibiting portion 23B is moved in the slide groove 24 for opening the inadvertent recording detection opening 22, the inadvertent recording prohibiting member 23 permits an inadvertent recording detection member of the driving device 40 to be intruded into the inadvertent recording detection opening 22. In such state, recording of data signals on the magnetic tape 7 by the recording/reproducing magnetic head is prohibited.

On the other hand, when the inadvertent recording prohibiting member 23 is actuated and moved from the above-mentioned first position towards right along the actuating guide opening 25 and is set to the second position indicated in FIG. 3, the inadvertent recording detection opening 22 is closed by the inadvertent recording prohibiting portion 23A moved along the slide groove 24. Consequently, the inadvertent recording detecting member of the driving device 40 is prohibited from being intruded into the inadvertent recording detection opening 22 in order to permit data signals to be recorded on the magnetic tape 7 by the recording/reproducing magnetic head.

The base plate 4 has a reflecting member mounting opening 26 at its front side proximate to the tape guide roll 10B. A reflecting member 27, built into the mounting opening 26, is formed as a substantially right-angled triangle, and has a mirror jointed to an oblique side facing the travel path of the magnetic tape 7. The reflecting member 27 constitutes, along with a discriminating hole provided in the magnetic tape 7, a design statement discriminating portion of the tape cartridge 1.

That is, the magnetic tape 7 has plural discriminating holes which are arrayed in a pattern for discriminating the design statement information, such as the recording start and recording end positions for data signals, coercive force, tape length or difference in recording density at the time of recording. When the tape cartridge 1 is loaded on the driving device 40, a light emitting element of the design specification discriminating sensor provided on the driving device 40, not shown, is positioned facing the bottom side of the reflecting member mounting opening 26. The front side of the main cartridge member 2 is provided with a design statement detection portion 28 of a reduced thickness positioned between the driving opening 21 and the inadvertent recording detection opening 22. When the tape cartridge 1 is loaded on the driving device 40, the design statement detecting portion 28 is confronted by a light receiving element, not shown, of the design statement discriminating sensor of the driving device 40.

Thus, the detection light emitted by the light emitting element is incident via the reflecting member mounting hole 26 so as to be reflected by a mirror of the reflecting member 27 towards the front surface of the main cartridge member 2 so as to be radiated on the magnetic tape 7 travelling along the front surface. Thus, the detection light discriminates the discriminating hole bored in the front surface and is projected towards the design statement detecting portion 28 on the front surface of the main cartridge member 2. The irradiated discrimination hole is detected by the light receiving element of the driving device 40 mounted facing the design statement detecting portion 28 for discriminating the above-mentioned design statement of the magnetic tape 7.

Figure 7:
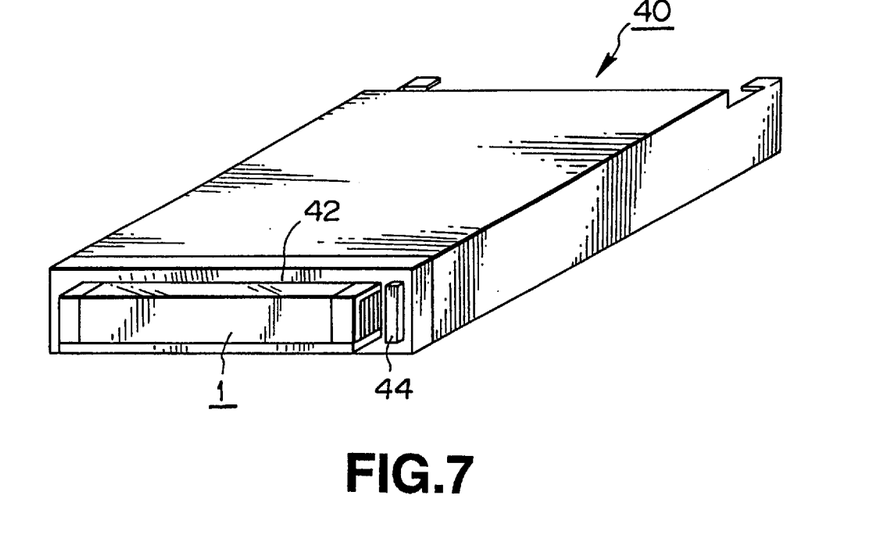
FIG. 7 is a perspective view for illustrating the state of loading the tape cartridge via a loading opening in the driving device.

The tape cartridge 1 can be smoothly loaded on the driving device 40 by an insertion guide mechanism provided between the tape cartridge 1 and the driving device 40. The insertion guide mechanism is made up of insertion guide recesses 20A, 20B formed in the fore-and-aft direction on both lateral sides of the main cartridge member 2, only the insertion guide recess 20B being shown, and insertion guide protrusions 43A, 43B formed in the fore-and-aft direction on both lateral sides of the cartridge loading section 41, only the insertion guide protrusion 43B being shown.

The tape cartridge 1 is inserted via a loading opening 42 of the driving device 40 so that the insertion guide recesses 20A, 20B are engaged by the insertion guide protrusions 43A, 43B in order to permit the tape cartridge 1 to be loaded smoothly and accurately on the cartridge loading section 41 of the driving device 40. The insertion guide protrusions 43A, 43B are of cross-sectional size substantially equal to that of the insertion guide recesses 20A, 20B.

Figure 4:
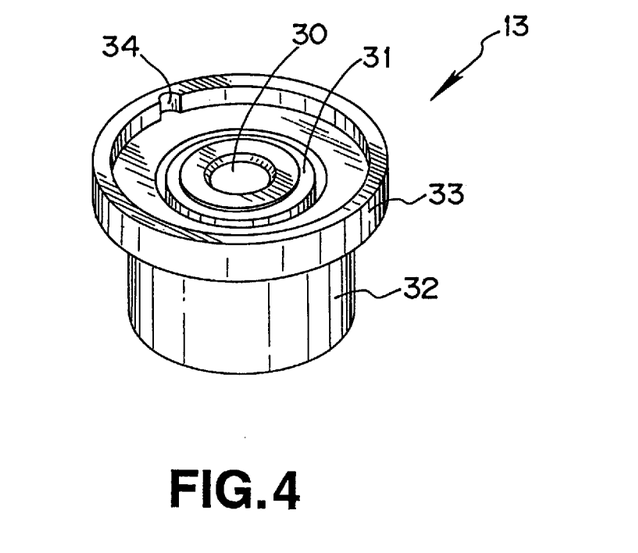
FIG. 4 is a perspective view of a drive roll provided in the tape cartridge.

The drive roll 13 which is driven to rotate by a capstan roll 46 of the driving device 40, is of a dual tube structure in which a bearing portion 31 having a shaft opening 30 extending through by the supporting shaft 15, operates as a core. A cylindrical main member 32 and a driving flange 33 formed circumferentially on an upper part of the main member 32 are formed around the bearing 31, as shown in FIG. 4. The main member 32 has its outer peripheral surface engaged by the endless driving belt 12. The magnetic tape 7 contacts this portion of the driving belt 12. The height of the main member 32 is substantially equal to the width of the magnetic tape 7.

The driving flange 33 has an outer diameter such that, when the drive roll 13 is rotatably supported by the supporting shaft 15, its outer peripheral surface is exposed via the driving opening 21 formed in the cover member 3. The main member 32 and the driving flange 33 exhibit moderate elasticity in the axial direction by virtue of the above-mentioned dual tube structure. The driving flange portion 33 has an axially protruding surface which defines an outer rim. The driving flange portion 33 keeps the upper edge of the magnetic tape 7 in contact with the outer peripheral surface of the main member 32.

Figure 8:
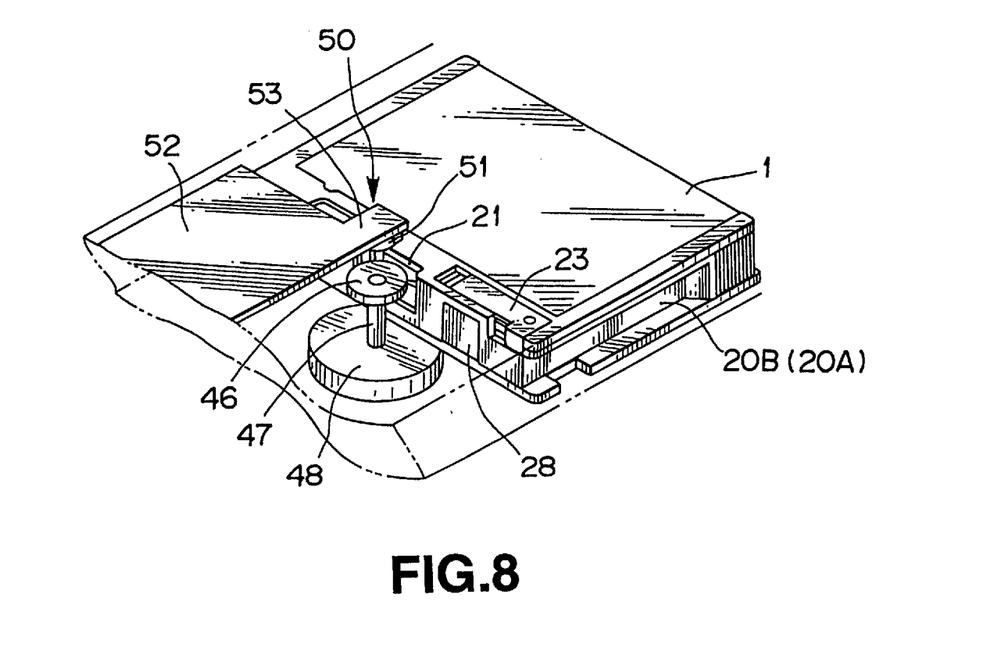
FIG. 8 is a schematic perspective view showing the state in which the tape cartridge has been loaded in a cartridge loading section of the driving device.

When the tape cartridge 1 is loaded into the cartridge loading section 41 of the driving device 40, the capstan roll 46 of the driving device 40 is pressed against the outer peripheral surface of the drive roll 13, as shown in FIG. 8.

In this case, the drive roll 13 and the capstan roll 46 are kept in drive contact with each other with a contact load of about 500 g.

The drive roll 13 has a rpm detection enabling section or marker 34 which enables the rpm and the rotating state of the drive roll to be detected. The rpm detection section 34 is constituted by a U-shaped groove (U-groove) formed in the outer rim constituting the driving flange portion 33 on the upper surface of the driving roll 13 so as to confront the top or upper surface of the cover member 3. The rpm detection section 34 can be formed in the inner peripheral surface of the outer rim simultaneously with the molding of the driving roll 13 or by subsequent machining. Although only one U-groove is formed in the embodiment shown, a plurality of such U-grooves may also be formed within the scope of the invention.

Figure 11:
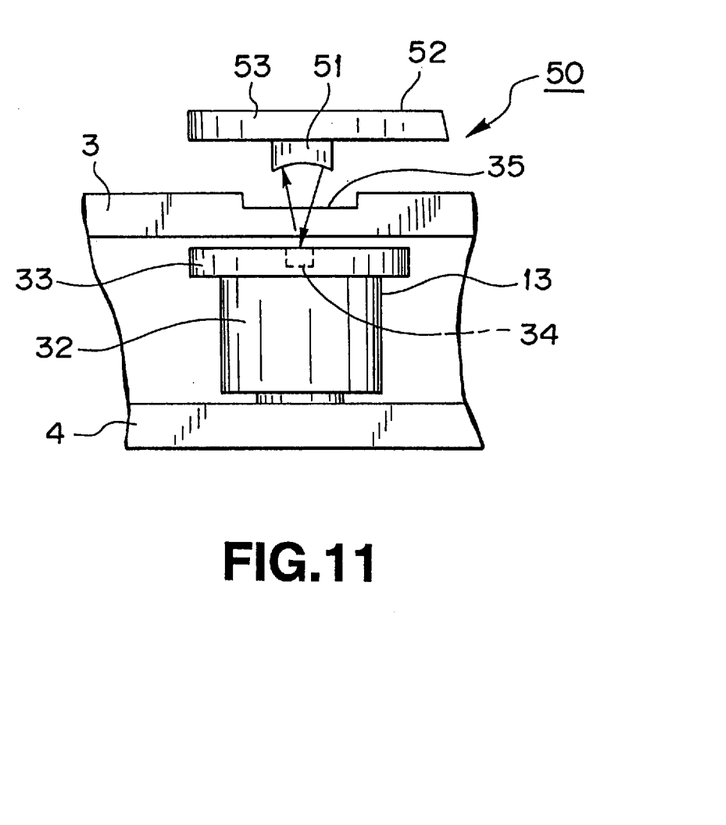
FIG. 11 is a schematic front view for illustrating the operation of detecting the state of rotation of a driving roll of the tape cartridge loaded on and run in rotation by the driving device.

The rpm detection enabling section 34 is detected by a photosensor device 50 provided on the driving device 40 as shown in FIG. 11 when the data cartridge 1 is loaded on the cartridge section 41 of the driving device 40.

The cover member 3 is provided with a detection window 35 opposite the rotational region of the drive roll 13, more specifically, the rotational region of the rpm detection enabling section 34. This detection window 35 is provided in the vicinity of the front edge of the top surface of the cover member 3 in registration with the driving opening 21, and is constituted by a reduced thickness portion of the cover member 3 similar to the design statement detecting portion 28. If there is no significant intrusion of dust and dirt, the detection window 35 may comprise a through-hole formed in the cover member 3.

Figure 5:
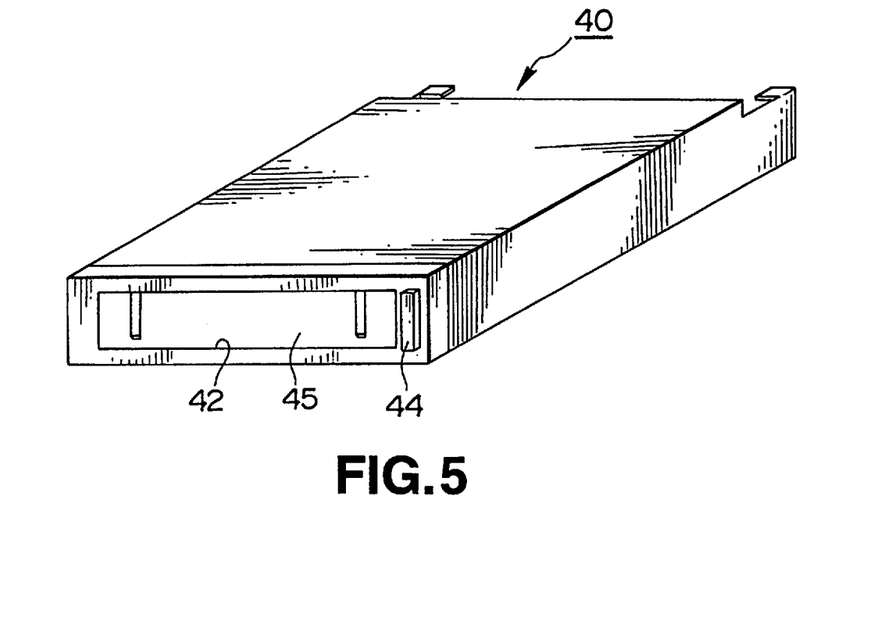
FIG. 5 is a perspective view showing a driving device in which the tape cartridge is loaded for recording/reproducing data signals.

The driving device 40, on which the tape cartridge 1 of the above-described embodiment is loaded, is hereinafter explained. The driving device 40 is a thin-walled casing having a front side loading opening 42 to allow the tape cartridge 1 to communicate with the inner cartridge loading section 41, as shown in FIG. 5.

The loading opening 42 is rectangular and is substantially the same size as the outer size of the back side of the tape cartridge 1, so that the cartridge loading section 41 is introduced from its front side first. An ejection button 44 for ejecting the tape cartridge 1 is provided beside the loading opening 42. A lid 41 is mounted for the loading opening 42 in a manner not shown in detail. The lid 45 normally closes the loading opening 42 for prohibiting dust and dirt from entering into the cartridge loading section 41, and is rotated towards the inside of the cartridge loading section 41 by insertion of the tape cartridge 1.

Figure 6:
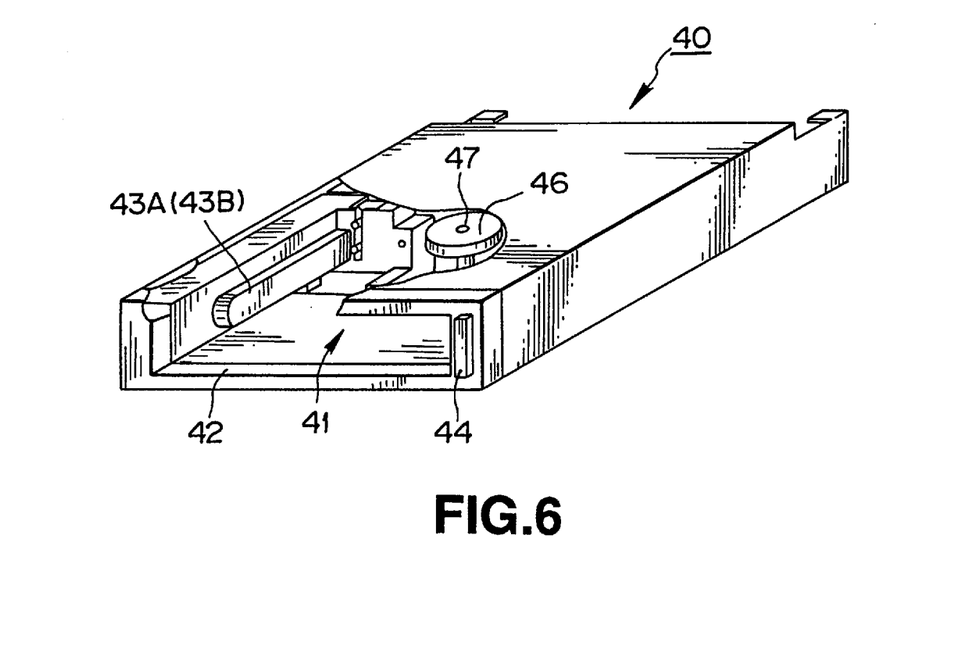
FIG. 6 is a perspective view for illustrating the internal mechanism of the driving device, with a portion thereof being cut away.

The cartridge loading section 41 is formed as a rectangular spacing sufficient to hold the tape cartridge 1 loaded therein, and is formed with the above-mentioned insertion guide protrusions 43 on both lateral sides in the fore-and-aft direction. In addition to the capstan roll 46 (in registration with the driving opening 21 for the loaded tape cartridge 1), the recording/reproducing magnetic head, not shown, (in registration with the recording/reproducing aperture 16), and the design statement discriminating sensor for detecting the design statement on the magnetic tape 7 or an optical detection section 50 for detecting the number of revolutions of the drive roll 13 as later explained, are provided in the cartridge loading section 41.

It is noted that description of the operation of recording data signals on the magnetic tape 7 by the recording/reproducing head, the operation of reproducing the recorded data signals and the operation of detecting the design statements of the magnetic tape 7 by the design statement discrimination sensor has been made hereinabove in connection with the construction and operation of the tape cartridge 1. Thus, the following description of the driving device 40 is made in connection with the driving of the tape cartridge 1 via the capstan roll 46 and the detection of the number of revolutions per minute of the driving roll 13.

Figure 9:
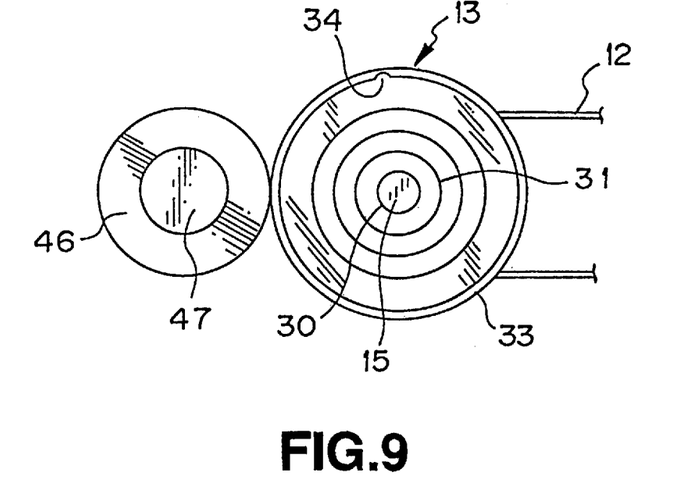
FIG. 9 is a schematic plan view for illustrating the state in which a capstan roll of the driving device is kept in surface contact with a driving roll of the tape cartridge for transmitting the rotation thereto.

When the tape cartridge 1 is loaded on the cartridge loading section 41, the capstan roll 46 is intruded via the driving opening 21 into the inside of the tape cartridge 1 into surface contact with the driving flange portion 33 of the driving roll 13 under the above-mentioned contact load. The capstan roll 46 is of a thickness substantially equal to the thickness of the driving flange 33. Since the driving flange portion 33 is protruded on the circumference of the main member 32 engaged by the magnetic tape 7 and the driving belt 12, there is no risk of the magnetic tape 7 or the endless driving belt 12 being pinched by the capstan roll 46.

Figure 10:
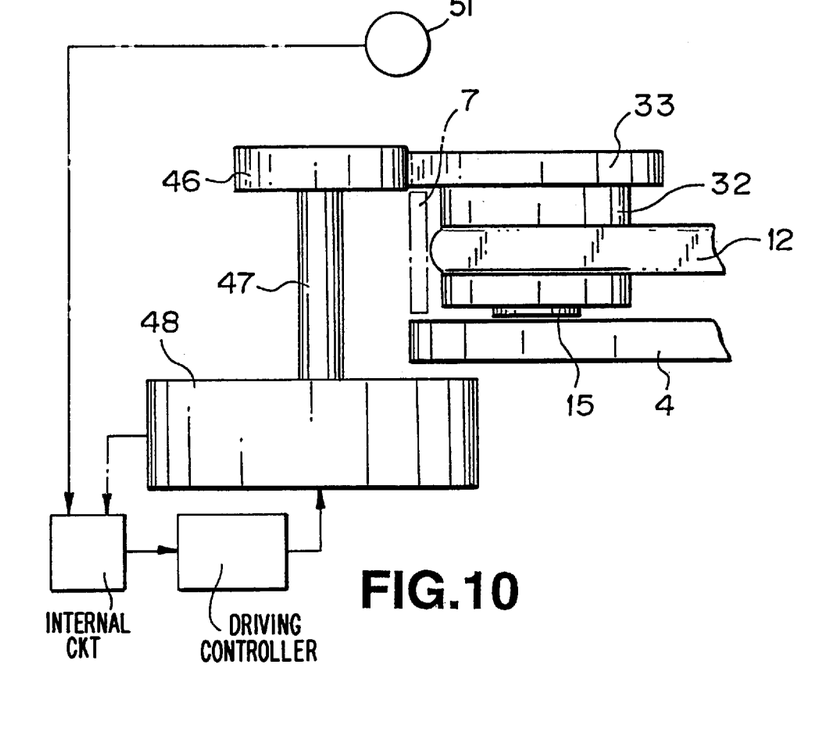
FIG. 10 is a schematic side view showing a rotation transmitting section.

The capstan roll 46 is secured to an output shaft 47 of a driving motor 48, so that, for fetching data signal stored in the memory of the main apparatus connected to the driving device or reproducing data signals recording on the magnetic tape 7 of the tape cartridge 1 to the memory of the main apparatus, the capstan roll 46 is driven by the driving motor 48. The capstan roll 46 is run at a pre-set rpm by the driving motor 48 which is precisely controlled by a driving controller, not shown. An output of the driving motor 48 may be connected via a gearing to the capstan roll 46.

The rotation of the capstan roll 46 is transmitted to the driving roll 13 for running the endless driving belt 12. The endless driving belt 12 causes the tape supply roll 8 and the tape take-up reel 9 to be rotated since the endless driving belt is pressed against the outer periphery of the magnetic tape 7 wound around the reels 8 and 9 under a pre-set tension. The tape take-up reel 8 and the tape take-up reel 9 when rotated, reel out the magnetic tape 7 and take up the reeled-out tape 7, respectively. The magnetic tape 7 travels along the front surface of the main cartridge member 2 for recording or reproducing data signals by the recording/reproducing magnetic head of the driving device 40 contacted with the magnetic tape 7 via the recording/reproducing aperture 16 opened into the inside of the main cartridge member 2.

The drive roll 13 has its driving flange portion 46 contacted with a surface contact with the driving flange 33, so that rotation is transmitted to the drive roll, as described above. However, there are occasions wherein precisely controlled rotation of the capstan roll 46 is not transmitted due to the slip occurring between the driving roll 13 and the capstan roll 46. In this case, the number of revolutions of the driving roll 13 is detected using rpm detection enabling section 34 provided on the upper surface of the roll, and the photodetector 50 and is used for controlling the driving motor 48 in a manner to correct the rotation of the drive roll 13.

The photodetector 50 is constituted by a photosensor 51 arranged facing the detection window 35 as shown in FIGS. 8 and 11. The photosensor 51 is mounted on a mounting piece 53 integral with a driving circuit substrate 52 on which are loaded electrical parts, electronic parts or circuit devices making up a controller of the driving device 40, are mounted. The mounting piece 53 faces the detection window 35 of the tape cartridge 1, as shown in FIG. 11.

The outgoing detection light from the light-emitting device of the photosensor 51 is transmitted through the thin-walled detection window 35 provided in the cover member 3 so as to be radiated on the upper surface of the drive roll 13. The detection light is reflected by the upper surface of the driving roll 13 so as to be transmitted again through the detection window 35 of the cover member 3 and to impinge on the light receiving element of the photosensor 51. The cover member 3 in which the detection window 35 is molded, is made of transparent to semi-transparent polycarbonate resin having high light transmittance (as described above) so that the light loss at the time of transmission through the detection window 35 may be substantially disregarded. Thus, the photosensor 51 may be constituted by a light-emitting element of a relatively small light volume.

The change in light volume of the detection light by the photosensor 51 radiated on the upper surface of the drive roll 13 in the rpm detection section 34 is received by the light receiving element for detecting the state of rotation of the driving roll 13. The driving device 40 compares the number of revolutions of the driving roll 13 detected by the photosensor 51 and the rotational pulses of the driving motor 48 as found by an internal circuit for calculating the ratio of transmission of rotation between the driving roll 13 and the capstan roll 46. Based upon the results of the calculations, the driving device 40 performs a correcting operation in conformity to the amount of slip incurred between the driving roll 13 and the capstan roll 46.

The correcting operation conforming to the amount of slip is performed by adjusting the rotational speed of the driving motor 48 via a driving controller. Such correcting operation may also be performed by adjustment of the capstan roll 46 contact pressure or of the recording frequency of the recording/reproducing magnetic head.

In the above-described tape cartridge 1, the rpm detection enabling element 34 is implemented by a height-wise U-shaped groove on the upper surface of the driving roll 13. However, the rpm detection enabling elements mentioned hereinbelow may also be employed within the scope of the present invention. That is, a drive roll 60 shown in FIG. 12 is similar to the drive roll 13 of the first embodiment in being a double tube structure in which a bearing 62 having a shaft hole 61 passed through by the supporting shaft 15 operates as a core and a cylindrical main member 63 and a driving flange portion 64 formed around the upper end of the main member 63 are formed integrally around the outer periphery of the bearing 62.

With the drive roll 60, the rpm detection enabling element 65 comprises a rib-shaped protrusion which is formed integrally with the inner periphery of the outer peripheral rim of the driving flange portion 64 and which extends towards the axis. The rib constituting the rpm detection section 65 enables more reliable detection of the number of revolutions by the photodetector 50 of the driving device 40 than with the rpm detection enabling element 34 by the U-shaped groove of the drive roll 13 of the first embodiment.

Figure 12:
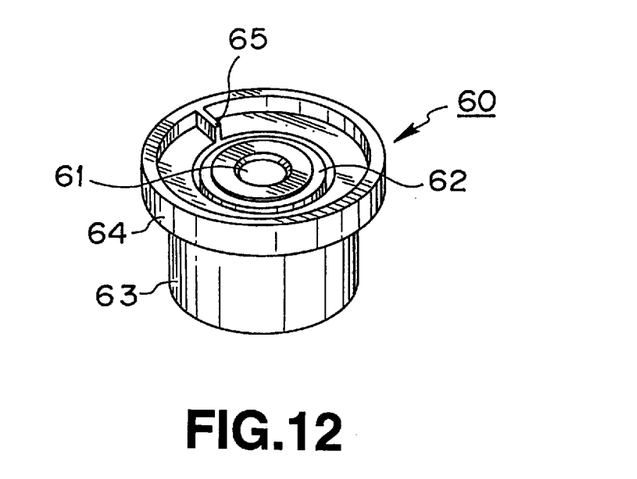
FIG. 12 is a perspective view of a driving roll provided on the tape cartridge.

It should be noted that the rib 65 is substantially of the same height as the driving flange 64, as shown in FIG. 12, so as not to abut against the inner surface of the cover member 3. One or more such ribs 65 may be formed simultaneously when molding the drive roll 60.

Figure 13:
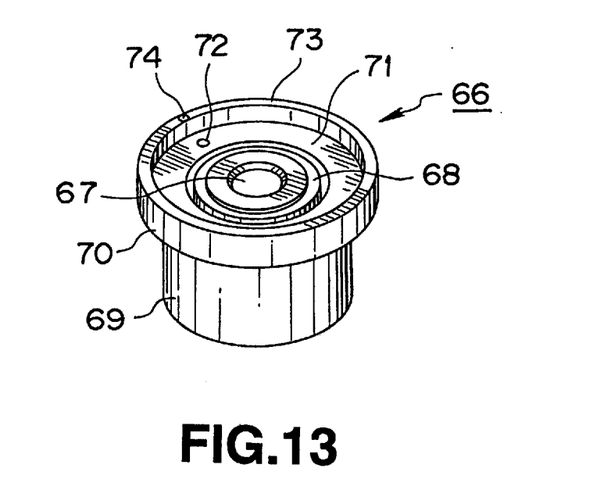
FIG. 13 is a perspective view showing a modification of the drive roll.

The drive roll 66 shown in FIG. 13 is similar to the drive rolls 13, 60 in being a double tube structure in which a bearing 68 having a shaft hole 67 passed through by the supporting shaft 15 operates as a core and a cylindrical main member 69 and a driving flange portion 70 formed around the upper end of the main member 69 are formed integrally around the outer periphery of the bearing 68.

A rpm detection enabling element 72 and an rpm detection enabling element 74 are formed on an upper surface 71 and on an upper rim of an outer rim 73 of driving flange portion 70 of the drive roll 65, respectively. The rpm detection enabling elements 72, 74 can be formed by, for example, pad printing or hot stamping, as markings of different color hues from the ground color hues of the drive roll 60. The rpm detection enabling elements 72, 74, constituted by the markings, dispense with correction of the metal molds for molding the driving roll 65 such that markings of an optional shape and number may be provided at an arbitrary location.

Figure 14:
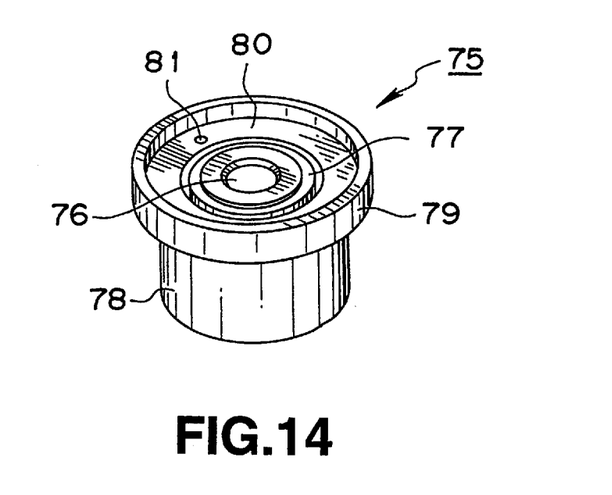
FIG. 14 is a perspective view showing another modification of the drive roll.

The drive roll 75 shown in FIG. 14 is similar to the drive rolls 13, 60, 65 in being a double tube structure in which a bearing 77 having a bearing hole 76 passed through by the supporting shaft 15 operates as a core and a cylindrical main member 78 and a driving flange portion 79 formed around the upper end of the main member 78 are formed integrally around the outer periphery of the bearing 77.

For molding the drive roll 75, a gate for charging molten resin is provided at an upper surface 80 which is a site not obstructive to rotation, such that gate marks are left on its upper surface 80. Thus, the gate mark is employed in the drive roll 75 as an rpm detection enabling element 81. In this case, the rpm detection enabling element 81 may be formed as a recess or as a protrusion and may be coated with a suitable color hue different from the ground color of the driving roll 75. With the drive roll 75, not only can the correction of the metal mold for molding be dispensed with, but also the gate mark having a constant position may be utilized for constituting the rpm detection enabling element 81 without the necessity of using positioning means.

The driving rolls are provided with rotation detection means on its upper surface facing the inner surface of the cover member 3. However, the rpm detection enabling element may also be provided on an surface of the drive roll other than its upper surface, such as its outer peripheral surface, if the overall shape of the tape cartridge 1 and the driving device 40 allow for such disposition. In such case, the detection section of the tape cartridge 1 may be provided in a region register with the rpm detection enabling element provided on the drive motor.

What is claimed is:

1. A tape cartridge and driving system including a capstan roll for driving a drive roll, comprising:
    a main cartridge member having a cover member and a base plate, said main cartridge member housing a pair of tape reels on which a magnetic tape is wound and adapted to travel along a front surface of the cover member;
    a driving device comprising:
    a drive roll rotatably housed within said main cartridge member and exposed via an opening formed in a front surface of the cover member so as to be placed in drive engagement with a capstan roll;
    an endless driving belt engaged with portions of the magnetic tape on the tape reels, and with said drive roll for driving the magnetic tape;
    rpm detection enabling means formed and movable with said drive roll for enabling a detection of the rotating state of the drive roll; and
    a detection window formed in said cover at a position facing said rpm detection enabling means for allowing illumination of the rpm detection enabling means;
    wherein said driving device further comprises:
    motor means for driving and positioning said capstan roll;
    a photo sensor which detects movement of the rpm detection enabling means; and
    motor driving controller means, responsive to said photo sensor and to the operation of the motor means, which corrects the rotational speed of the motor means which drives the capstan roll and adjusts the contact pressure between the capstan roll and the drive roll to ensure intimate contact therebetween.

2. The tape cartridge and driving system and driving system as claimed in claim 1, wherein said drive roll has an outer rim portion, and the rpm detection enabling means comprises a groove formed in a part of the outer rim on an upper surface of the drive roll facing the cover member.

3. The tape cartridge and driving system as claimed in claim 1, wherein the drive roll has an outer rim portion, and the rpm indicating means comprises a rib-like protrusion which extends towards an axis of the drive roll from the outer rim and which is formed on an upper surface of the drive roll facing the cover member.

4. The tape cartridge and driving system as claimed in claim 1, wherein the rpm detection enabling means comprises a marking formed on one of a peripheral surface and an upper surface of said drive roll which respectively face one of a lateral surface or a top surface of the cover member.

5. The tape cartridge and driving device system in any one of claims 1 to 4, wherein the cover member is formed of a transparent or semi-transparent synthetic resin material exhibiting high light transmittance.

6. The tape cartridge and driving system as claimed in claim 5, wherein the detection window is formed by reducing the thickness of a portion of the cover member opposite said drive roll.

7. The tape cartridge and driving system as claimed in claim 5, wherein the detection window comprises a through hole formed in a portion of the cover member opposite said drive roll.

8. A tape cartridge and driving system including a capstan roll, which includes a cartridge member having a cover member, a base plate, and a pair of tape reels on which a magnetic tape is wound, comprising:
    a driving device comprising:
    a drive roll rotatably housed within the cartridge member and adapted to be driven by engagement with said capstan roll;
    an endless driving belt engaged with portions of the magnetic tape on the tape reels and with said drive roll, for driving the magnetic tape;
    rpm detection enabling means for indicating the rotation speed of said drive roll, said rpm detection enabling means including:
    a marker formed on a surface of the drive roll; and
    a detection window formed in the cover at a position opposed to said drive roll through which movement of said marker will be optically detected;
    motor means for driving and positioning said capstan roll;
    a photo sensor which detects the movement of the marker of said rpm detection enabling means; and
    motor driving controller means, responsive to said photo sensor and to the operation of the motor means, which corrects the rotational speed of the motor means which drives the capstan roll and adjusts the contact pressure between the capstan roll and the drive roll to ensure intimate contact therebetween.

9. The tape cartridge and drawing system as claimed in claim 8, wherein said marker is a notch-like groove formed in a part of a surface of the drive roll.

10. The tape cartridge and driving system as claimed in claim 8, wherein said marker is a radially extending rib-like protrusion formed on a surface of the drive roll.

11. The tape cartridge and driving system as claimed in claim 8, wherein the detection window is formed of a transparent or semi-transparent synthetic resin material exhibiting high light transmittance.

12. The tape cartridge and driving system as claimed in claim 8, wherein the detection window is formed by reducing the thickness of a portion of the cover member opposite the drive roll.

13. A tape cartridge and driving system including a capstan roll for driving a drive roll, comprising:

- a main cartridge member having a cover member and a base plate, said main cartridge member housing a pair of tape reels on which a magnetic tape is wound and adapted to travel along a front surface of the cover member, while being transferred from one reel to the other;
- a driving device comprising:
- a drive roll, for driving said transfer of the tape, rotatably housed within said main cartridge member and exposed via an opening formed in the cover member so as to be placed in drive engagement with said capstan roll;
- an endless driving belt engaged with portions of the magnetic tape on the tape reels, and with said drive roll for driving the magnetic tape: and
- rpm detection enabling means formed and movable with said drive roll for enabling a detection of the rotating state of the drive roll;

wherein said driving device further comprises:

motor means for driving and positioning said capstan roll;

a photo sensor which detects movement of the rpm detection enabling means; and motor driving controller means, responsive to said photo sensor and to the operation of the motor means, which corrects the rotational speed of the motor means which drives the capstan roll and adjusts the contact pressure between the capstan roll and the drive roll to ensure intimate contact therebetween.

* * * * *

UNITED STATES PATENT AND TRADEMARK OFFICE
CERTIFICATE OF CORRECTION

PATENT NO. : 5,850,316
DATED : December 15, 1998
INVENTOR(S) : Masanori SATO, Kengo SAITO and Osamu KOIZUMI It is certified that error appears in the above-identified patent and that said Letters Patent is hereby corrected as shown below:

Claim 2 should read:

2. The tape cartridge and driving system as claimed in claim 1, wherein said drive roll has an outer rim portion, and the rpm detection enabling means comprises a groove formed in a part of the outer rim on an upper surface of the drive roll facing the cover member.

Signed and Sealed this

Thirty-first Day of August, 1999

*Attest:*

Q. TODD DICKINSON

*Attesting Officer*     Acting Commissioner of Patents and Trademarks